(12) United States Patent
Jeong et al.

(10) Patent No.: US 7,323,651 B2
(45) Date of Patent: Jan. 29, 2008

(54) METHOD FOR ISOTOPE SEPARATION OF THALLIUM

(75) Inventors: Do-Young Jeong, Daejeon (KR); Kwang-Hoon Ko, Daejeon (KR); Gwon Lim, Daejeon (KR); Cheol-Jung Kim, Daejeon (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 0 days.

(21) Appl. No.: 10/522,461

(22) PCT Filed: Sep. 18, 2002

(86) PCT No.: PCT/KR02/01749

§ 371 (c)(1),
(2), (4) Date: Jan. 25, 2005

(87) PCT Pub. No.: WO2004/011129

PCT Pub. Date: Feb. 5, 2004

(65) Prior Publication Data

US 2005/0269198 A1    Dec. 8, 2005

(30) Foreign Application Priority Data

Jul. 30, 2002  (KR) .............................. 2002-44828

(51) Int. Cl.
*B01D 5/00*   (2006.01)

(52) U.S. Cl. .................................................. 204/157.2

(58) Field of Classification Search .............. 204/157.2
See application file for complete search history.

(56) References Cited

U.S. PATENT DOCUMENTS 4,793,307 A    12/1988 Quenneville et al.
(Continued)

FOREIGN PATENT DOCUMENTS

EP    0 884 095 A1    12/1998
(Continued)

*Primary Examiner*—Edna Wong
(74) *Attorney, Agent, or Firm*—The Webb Law Firm, P.C.

(57) ABSTRACT

A method for isotope separation of thallium using a laser beam comprising the steps of: (a) producing photons of a first frequency by a laser system, wherein a wave length of the first frequency is about 378 nm; (b) producing photons of a second frequency by the laser system, wherein a wave length of the second frequency is about 292 nm; (c) producing photons of a third frequency by the laser system, wherein a wave length of the third frequency is in the range of 700 nm to 1400 nm; (d) applying the photons of the first, second and third frequencies to the vapor of the thallium, wherein the photons of the first frequency pump isotope-selectively a plurality of ground state thallium atoms through an excited state into a metastable state, and wherein the photons of the second frequency excite a plurality of metastable state thallium atoms to an intermediate, resonant state, and wherein the photons of the third frequency ionize a plurality of atoms in the intermediate, resonant state through continuum states; and (e) collecting the isotope ions. Thallium isotope can efficiently be separated with small scale facilities.

11 Claims, 7 Drawing Sheets

U.S. PATENT DOCUMENTS

| | | |
|---|---|---|
| 5,202,005 A | 4/1993 | Paisner et al. |
| 5,221,446 A * | 6/1993 | Eerkens ............... 204/157.22 |
| 5,376,246 A | 12/1994 | Page |
| 5,443,702 A | 8/1995 | Haynam et al. |
| 5,945,649 A | 8/1999 | Scheibner et al. |

FOREIGN PATENT DOCUMENTS

| | | |
|---|---|---|
| FR | 2 790 974 A1 | 9/2000 |
| FR | 2790974 A1 * | 9/2000 |
| JP | 11-99320 A | 4/1999 |
| JP | 2000-262866 A | 9/2000 |

* cited by examiner

METHOD FOR ISOTOPE SEPARATION OF THALLIUM

BACKGROUND OF THE INVENTION

1. Field of the Invention

The present invention relates in general to a method for isotope separation of thallium, and more particularly to laser isotope separation of thallium using a laser beam.

2. Description of the Prior Art

In nature, thallium contains two isotopes, including $^{203}$Tl (29.5%) and $^{205}$Tl (70.5%). $^{203}$Tl is used as a source material to produce $^{201}$Tl radioisotope. $^{201}$Tl is produced in a cyclotron by irradiating the enriched $^{203}$Tl target with a 19-31 MeV proton beam according to the $^{203}$Tl(p, 3n) $^{201}$Tl reaction. $^{201}$TlCl is a radiopharmaceutical for SPECT (single photon emission computerized tomography) to diagnose heart diseases and tumors.

The unique commercialized method used to separate thallium isotopes is referred to as the electromagnetic method. In principle, the technique is simple. When passing between the poles of a magnet, a monoenergetic beam of ions of naturally occurring thallium splits into two streams according to their momentum, one per isotope, each characterized by a particular radius of curvature. Collecting cups at the ends of the semicircular trajectories catch the homogenous streams. It is generally agreed that electromagnetic separation represents the most versatile technology with the greatest experience base of any separation technology, but unfortunately it has low throughput and high operating cost.

Laser isotope separation (LIS) technique employing isotope-selective photoionization process of atoms has been said to be an alternative to overcome the demerits of electromagnetic method. The technique has been demonstrated on a number of elements, including mercury, gadolinium, and other elements. U.S. Pat. No. 4,793,307 (1988), U.S. Pat. No. 5,202,005 (1993), U.S. Pat. No. 5,376,246 (1994), and U.S. Pat. No. 5,443,702 (1995) are related to laser isotope separation of mercury(Hg), gadolinium(Gd), zirconium (Zr), and erbium(Er) atoms, respectively. Japanese patent publication No. 1999-99320A suggests a new photoionization pathway different from that of U.S. Pat. No. 4,793,307 (1988).

The determination whether LIS of a certain element is technically feasible or not requires detailed consideration of a variety of issues including the photoionization pathway, the associated lasers, and the atomic vapor. A definitive evaluation of the applicability of LIS requires knowledge of the isotope shifts, hyperfine structures, level energies, angular momentum of each level, level lifetimes, etc. For those cases where LIS is technically feasible, an economic evaluation can be performed in the consideration of the cost competitiveness of this technique against other techniques, which requires knowledge of physical and chemical properties of the element, required laser power, isotope selectivity and ionization efficiency of the photoionization process, etc.

Thallium has no available autoionization levels and isotope shifts of thallium energy levels are relatively small compared with other elements. Accordingly, photoionization of thallium atoms through an autoionization level is not possible and also isotope selectivity might be very small for the conventional stepwise photoionization process, which was applied in the U.S. Pat. No. 4,793,307 (1988) and U.S. Pat. No. 5,443,702 (1995). Furthermore, it may not be possible to separate the thallium isotopes using the angular momentum selection rule applied in the U.S. Pat. No. 5,202,005 (1993) since the nuclear magnetic moments of $^{203}$Tl and $^{205}$Tl are all the same.

Japanese patent publication No. 2000-262866A adapts the isotope-selective excitation and field ionization method for thallium isotope separation, which was disclosed in U.S. Pat. No. 5,945,649 for $^{210}$Pb removal from lead isotopes. In this patent, thallium atoms in the ground state are isotope-selectively excited to a Rydberg state at the energy of about 49,000 cm$^{-1}$ by two lasers of 377.6 nm and 443.7 nm wavelengths and they are field-ionized by an external electric field. During the excitation process, detuning of about 1 GHz is given between laser frequencies and the intermediate level at the energy of 26,477 cm$^{-1}$. This is a 2-color 2-photon excitation process. To obtain high isotope selectivity as well as high excitation efficiency by using 2-photon excitation process, lasers should have nearly Fourier-transform-limited bandwidth and also should counter-propagate. The Stark shift caused by detuning from the intermediate level decreases the 2-photon excitation efficiency. To avoid this, laser powers and frequencies should be controlled finely according to the $\pi$-pulse condition and also laser pulses should be overlapped exactly. Since it is practically impossible to overlap the laser pulses during the entire counter-propagation in medium, drop of the excitation efficiency is inevitable. Furthermore, for the case of mass production of thallium isotopes, initially produced plasma may screen the external electric field and consequently decreases the field ionization efficiency. For these reasons, although the Japanese patent publication No. 2000-262866A may be technically feasible, there might be several obstacles to overcome for this method to be commercially practical.

Hence it is an object of the present invention to solve the above mentioned problems and also to provide an improved practical thallium isotope separation method.

SUMMARY OF THE INVENTION

In accordance with the present invention, there is provided a method for separating an isotope of thallium in an atomic vapor containing a plurality of isotopes of thallium including said isotope, said method comprising the steps of:

(a) producing photons of a first frequency by a laser system, wherein a wave length of said first frequency is about 378 nm;

(b) producing photons of a second frequency by said laser system, wherein a wave length of said second frequency is about 292 nm;

(c) producing photons of a third frequency by said laser system, wherein a wave length of said third frequency is in the range of 700 nm to 1400 nm;

(d) applying said photons of said first, second and third frequencies to said vapor of said thallium, wherein said photons of said first frequency pump isotope-selectively a plurality of ground state thallium atoms through an excited state into a metastable state, and wherein said photons of said second frequency excite a plurality of metastable state thallium atoms to an intermediate, resonant state, and wherein said photons of said third frequency ionize a plurality of atoms in said intermediate, resonant state through continuum states; and (e) collecting said isotope ions.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 illustrates the conceptual diagram for thallium laser isotope separation method according to the present invention wherein

FIG. 7 shows the observed mass spectra of isotope-selective photoionization of thallium atoms wherein:

plot (a) shows the mass spectra of non-selectively photoionized thallium atoms, plot (b) shows the mass spectra when the frequency of optical pumping laser is resonant with $^{205}$Tl isotopes, and plot (c) shows the mass spectra when the frequency of optical pumping laser is resonant with $^{203}$Tl isotopes.

DETAILED DESCRIPTION OF THE INVENTION

Herein is disclosed an isotope-selective photoionization process and apparatus for thallium isotope separation from natural thallium that involves isotope-selective optical pumping followed by photoionization of thallium atoms and then electrostatic extraction of ions. This scheme takes advantage of the large optical pumping cross-section as well as the large photoionization cross-section, and consequently only modest laser fluences are required. According to this scheme, it is possible to photoionize target isotopes selectively and efficiently by employing both isotope selective optical pumping (ISOP) of target isotopes into a metastable state and resonant photoionization (RPI) of metastable state thallium isotopes. In the latter process, metastable thallium atoms are photoionized to continuum states through a resonant excited state. Efficient ISOP of the target isotopes can be achieved with a single frequency continuous wave (CW) laser. A pulsed UV laser and a high power pulsed IR laser are used for RPI process.

$^{203}$Tl laser isotope separation based on this invention is economically more efficient than the conventional electromagnetic separation. Also, this invention can overcome the limited scope of the Japanese patent publication No. 2000-262866A. In conclusion, the present invention makes the $^{203}$Tl isotope separation possible for the mass production even with a relatively small-scale facility and the commercially available lasers.

An example of the present invention will now be described in greater detail for a thallium laser isotope separation method with reference to more specific drawing and data, which are for a better understanding of the invention and not for limiting purposes.

Figure 1A:
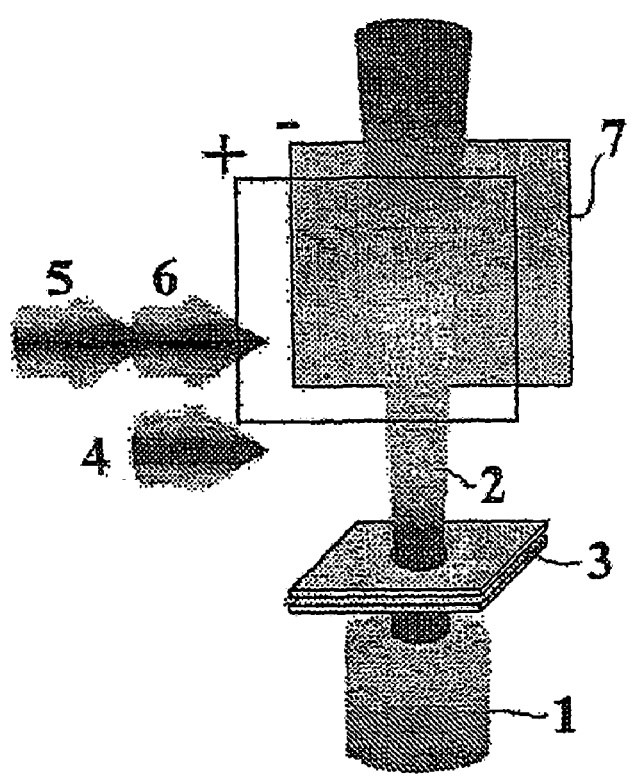
FIG. 1(a) is a front schematic view and FIG. 1(b) is side schematic view of an apparatus for carrying out the method.
Figure 1B:
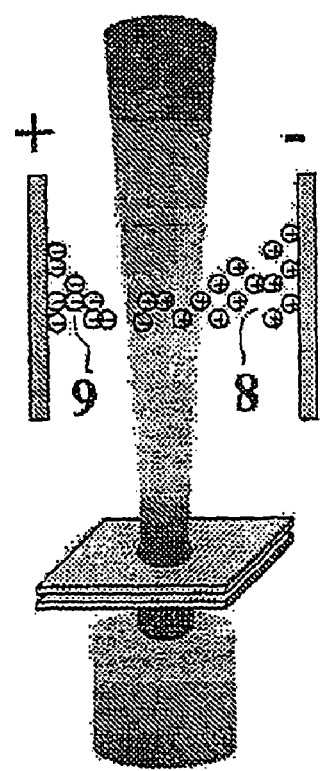

FIG. 1 illustrates the conceptual diagram for the thallium laser isotope separation method. Thallium atomic beam 2 is generated by heating thallium at a temperature between 800-1000° C. using thermal heater 1 and collimated by an atomic beam collimator 3, and then is optically and isotope-selectively pumped into a metastable state by a CW laser 4. The optically pumped thallium isotopes are photoionized by a pulsed UV laser 5 and a pulsed IR laser 6. The photoionized thallium ions 8 and electrons 9 generated during the photoionization are separated from the atomic beam by an extractor 7 biased by an external electric field.

Figure 2:
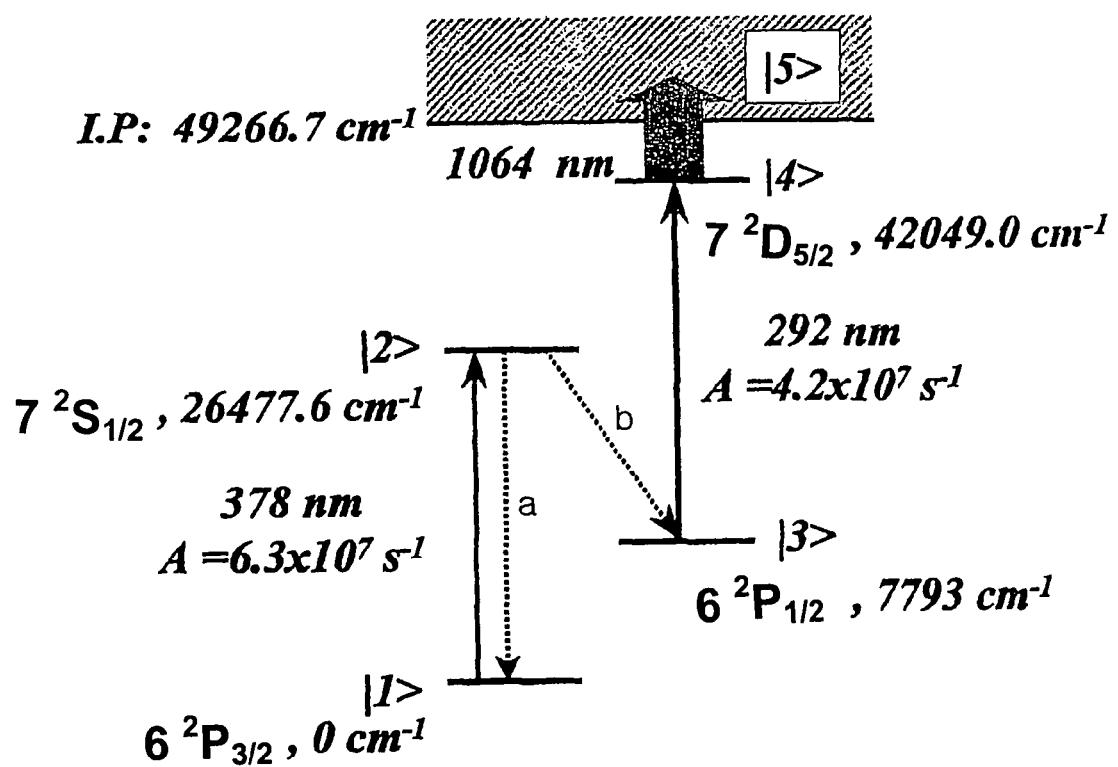
FIG. 2 shows a partial energy level diagram of thallium atoms.

FIG. 2 shows a partial energy level diagram of thallium atoms when thallium ions are separated according to the present invention. The target isotopes in the ground state |1> are optically and isotope-selectively excited to the level |2> by a CW laser. The excited isotopes in the level |2> may be either de-excited to the ground level |1> by a spontaneous decay process (a in FIG. 2) or pumped into the metastable state |3> (b in FIG. 2). While the target isotopes stay in the metastable state |3>, the de-excited isotopes to the ground state |1> can be excited to the level |2> again. Because the lifetime of the metastable state is long enough (about 250 μsec), most of the target isotopes can be pumped into the metastable state |3> by the repeated excitation and decay processes. On the other hand, non-target isotopes are not excited and stay in the ground state. As a result, high optical pumping efficiency as well as high target isotope selectivity can be achieved. The target isotopes pumped into the metastable state |3> will be photoionized to the continuum state |5> through the resonant excited state |4> by pulsed lasers.

Thallium atoms have such a simple electronic structure that only three energy states exist below energy of 30,000 cm$^{-1}$, such as the ground state (6 $^2P_{1/2}$: 0 cm$^{-1}$), metastable state (6 $^2P_{3/2}$: 7,793 cm$^{-1}$), and the excited state (7 $^2S_{1/2}$: 26,447.6 cm$^{-1}$). And thallium atoms have several advantages for efficient optical pumping. These are:

(a) large electric dipole moment of the transition between 6 $^2P_{1/2}$ and 7 $^2S_{1/2}$ (b) very short level lifetime of 7 $^2S_{1/2}$ (7.5 nsec)

(c) branching ratio of the transition between 7 $^2S_{1/2}$ and the metastable state is bigger than that of the transition between 7 $^2S_{1/2}$ and the ground state.

Hence, very efficient pumping of thallium atoms into the metastable state can be easily achieved if a CW laser frequency (about 378 nm in the wavelength) is resonant to the transition line of 6 $^2P_{1/2}$ and 7 $^2S_{1/2}$. Because the metastable state population of thallium atoms is lower than 10$^{-3}$ when thallium is heated at temperature to generate an atomic beam, their initial population does not affect on the isotope selectivity at this temperature range.

Figure 3:
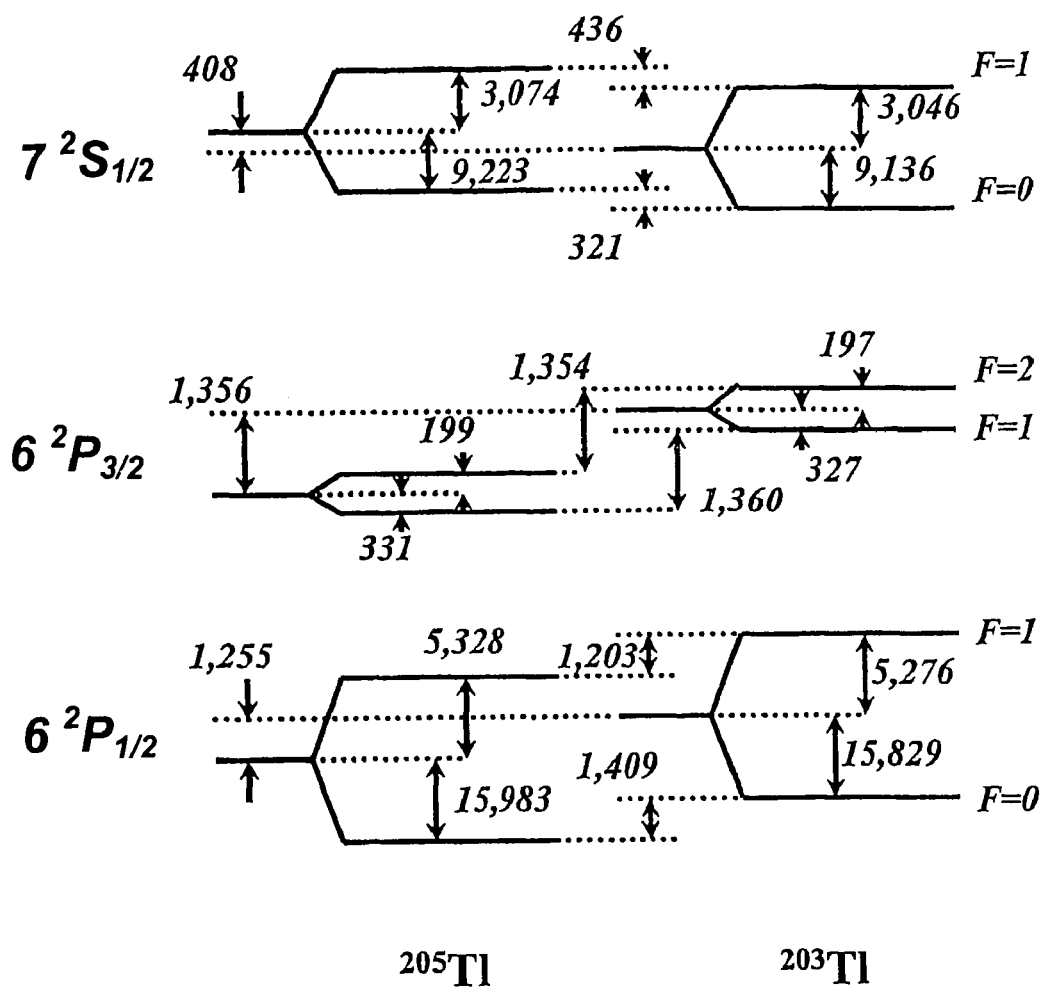
FIG. 3 shows isotope shifts and hyperfine structures of thallium isotopes.

FIG. 3 shows isotope shifts and hyperfine structures of thallium isotopes related to the optical pumping transitions. The isotope shift of the transition between 6 $^2P_{1/2}$ and 7 $^2S_{1/2}$ is about 1.6 GHz and about 1.5 GHz for $F_g=1->F_e=1$ and $F_g=0->F_e=1$, respectively. Hence, highly selective optical pumping of the target isotope into the metastable state is possible if Doppler width of an atomic beam is less than a few hundred MHz (for example, approximately 100 MHz) and a single frequency CW laser is used as an optical pumping laser.

Figure 4:
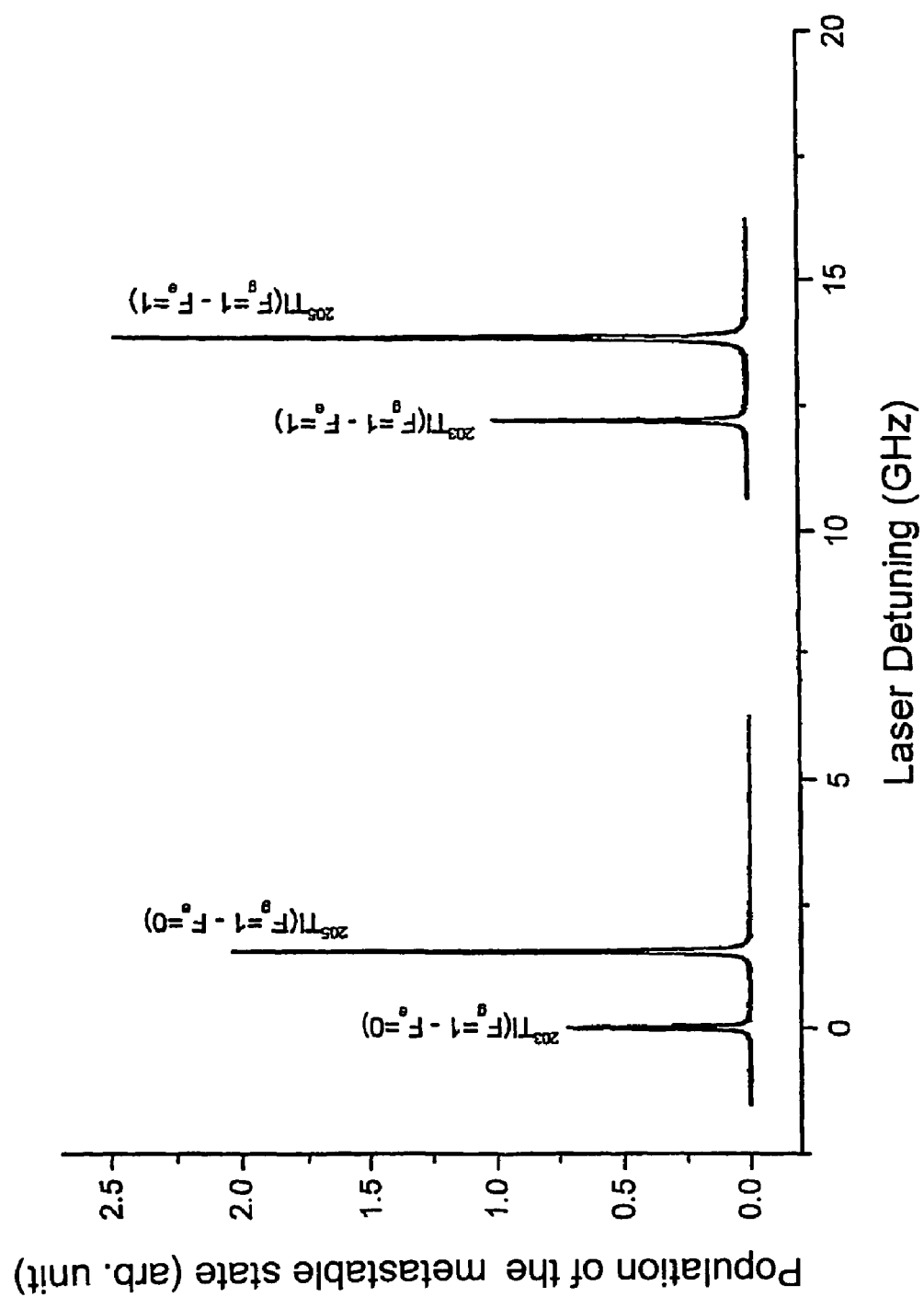
FIG. 4 shows the experimentally measured optical pumping spectrum of thallium isotopes by using a CW laser which has Gaussian intensity distribution (full width at half maximum: 10 mm) and output power of 20 mW.
Figure 5:
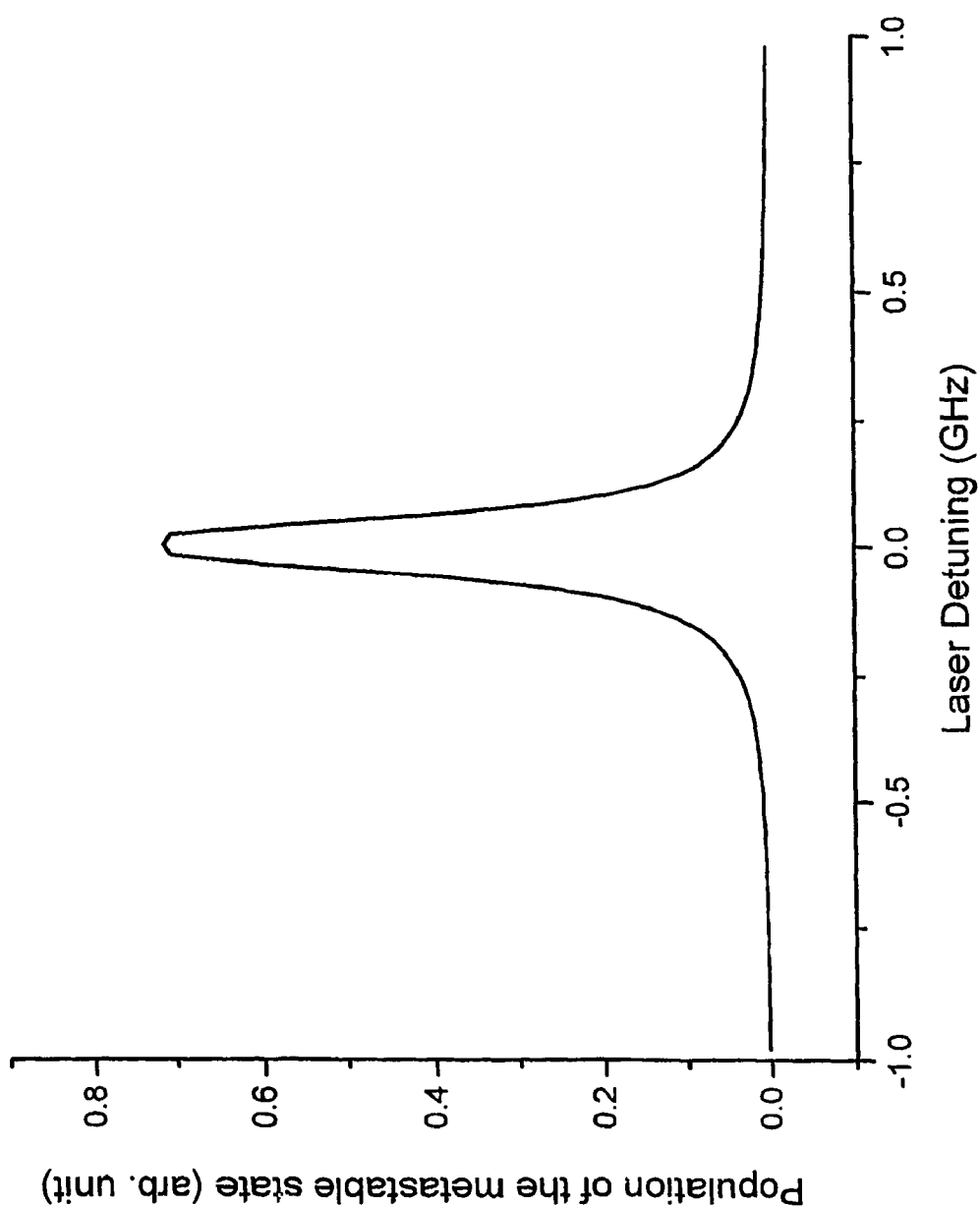
FIG. 5 shows is the calculated optical pumping spectrum of thallium isotopes by using a CW laser which has Gaussian intensity distribution (full width at half maximum: 10 mm) and output power of 200 mW.

FIG. 4 shows the experimentally measured optical pumping spectrum of the transition of $F_g=1-\geq F_e=1$ by using a CW laser which has Gaussian intensity distribution (full width at half maximum: 10 mm) and output power of 20 mW. FIG. 5 shows the calculated optical pumping spectrum of the same transition, assuming that a CW laser has Gaussian intensity distribution (full width at half maximum:

10 mm) and output power of 200 mW. It is clearly shown that the isotope selectivity is very high in this optical pumping process.

Figure 6:
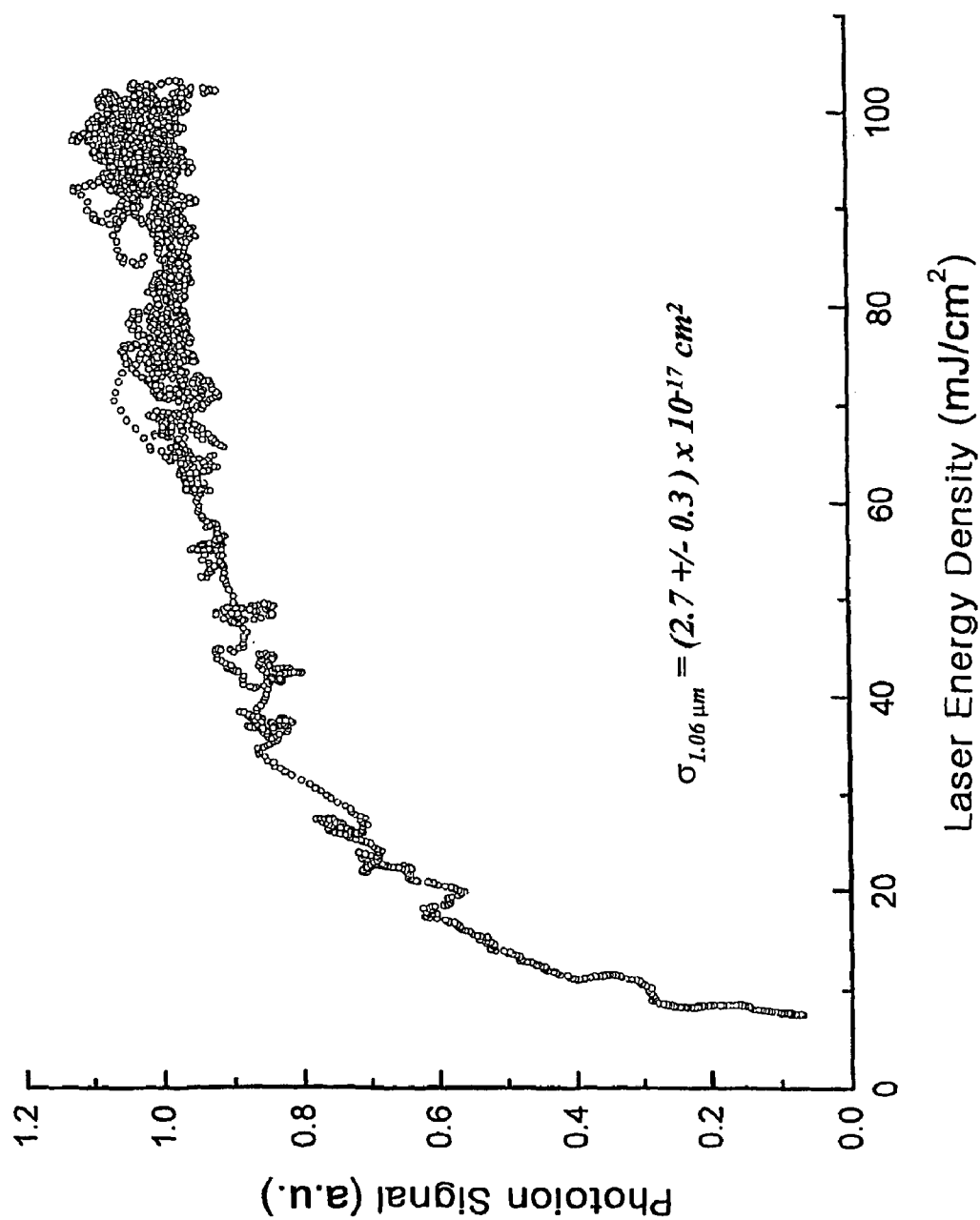
FIG. 6 shows the measured photoionization cross-section of $7\ ^2D_{5/2}$ level of thallium atoms at the wavelength of 1064 nm of a Nd:YAG laser.

While the hyperfine splitting of the ground state is about 21 GHz, that of the metastable level is about 500 MHz. Hence, effective photoionization of the metastable state atom is expected without interferences of hyperfine structures. Even with a relatively low power laser, metastable thallium atoms can be efficiently excited to the state $7\ ^2D_{3/2}$ (42,011.4 cm$^{-1}$) or to the state $7\ ^2D_{5/2}$ (42,049.0 cm$^{-1}$) because of their large electric dipole moments. The transition wavelength for the excitation is about 292 nm. FIG. 6 shows the measured photoionization cross-section of $7\ ^2D_{5/2}$ level of thallium atoms at the wavelength of 1064 nm of a Nd:YAG laser. The photoionization cross-section of $2.7 \times 10^{-17}$ cm$^2$ is big enough so that more than 80% of the thallium atoms in the excited state $7\ ^2D_{5/2}$ can be ionized by a Nd:YAG laser with the pulse energy density of 40 mJ/pulse/cm$^2$. Since the ionization potential (IP) of thallium atoms is about 49266.7 cm$^{-1}$, efficient photoionization is expected if an ionizing IR laser with modest power has the wavelength in the range of 700~1400 µm, which corresponds to energy range of 49266.7 cm$^{-1}$~55000 cm$^{-1}$.

Figure 7:
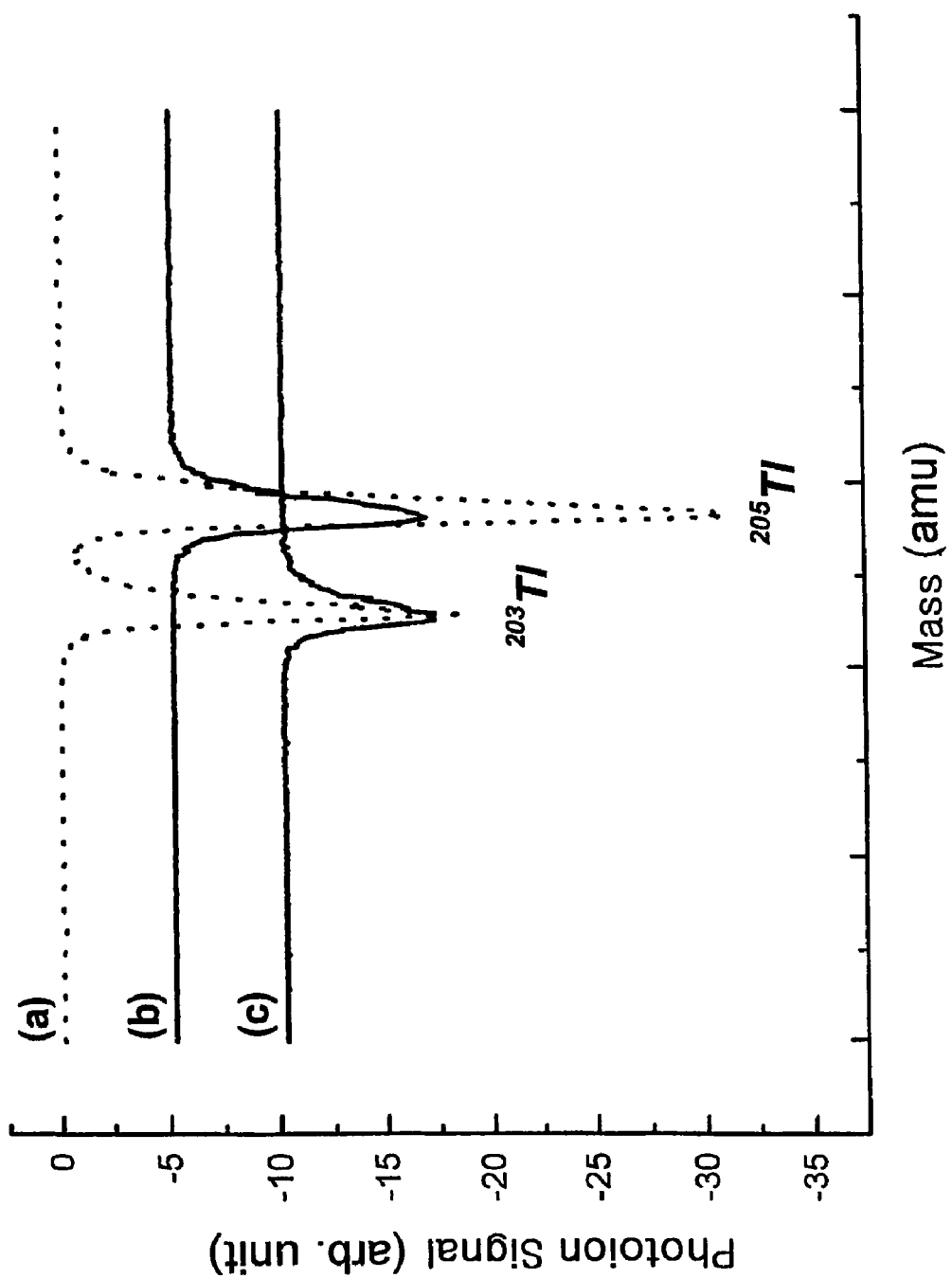

FIG. 7 shows the observed Time-of-Flight (TOF) mass spectra of isotope-selective photoionization of thallium atoms according to this invention. When the CW laser frequency is scanned while pulsed laser frequencies are fixed, photoionization of each thallium isotope is possible.

For the production of $^{203}$Tl isotope with the capability of 1 kg/year, the required laser powers are estimated to be 500 mW, 4 W, and 500 W for a CW optical pumping laser, a pulsed UV laser, and a pulsed IR laser, respectively. For pulsed lasers, repetition rate of 5 kHz or more and pulse-width of a few tens of ns are also required. Such a laser system can be constructed by using commercially available lasers.

What is claimed is:

1. A method for separating an isotope of thallium in an atomic vapor containing a plurality of isotopes of thallium, said method comprising the steps of:
   (a) producing photons of a first frequency by a laser system, wherein a wave length of said first frequency is about 378 nm;
   (b) producing photons of a second frequency by said laser system, wherein a wave length of said second frequency is about 292 nm;
   (c) producing photons of a third frequency by said laser system, wherein a wave length of said third frequency is in the range of 700 nm to 1400 nm;
   (d) applying said photons of said first, second and third frequencies to said vapor, wherein said photons of said first frequency pump isotope-selectively a plurality of ground state thallium atoms through an excited state into a metastable state, and wherein said photons of said second frequency excite a plurality of metastable state thallium atoms to an intermediate, resonant state, and wherein said photons of said third frequency ionize a plurality of atoms in said intermediate, resonant state through continuum states; and
   (e) collecting said isotope ions.

2. The method of claim 1 wherein said photons of said first frequency are produced by one or more continuous wave lasers.

3. The method of claim 1 wherein the photons of said first frequency pump said atoms of thallium from the ground state through the excited state at an energy of 26477.6 cm$^{-1}$ relative to zero energy of the ground state and into the metastable state at an energy of 7793 cm$^{-1}$ relative to the zero energy of the ground state.

4. The method of claim 1 wherein the photons of said second frequency are produced by one or more pulsed lasers.

5. The method of claim 4 wherein the photons of the second frequency excite the thallium atoms in the metastable state to the intermediate, resonant state at an energy of 42049.0 cm$^{-1}$ relative to zero energy of said ground state.

6. The method of claim 1 wherein the photons of the second frequency excite the thallium atoms in the metastable state to the intermediate resonant state at an energy of 42049.0 cm$^{-1}$ relative to zero energy of said ground state.

7. The method of claim 1 wherein the photons of the second frequency excite the thallium atoms in the metastable state to the intermediate, resonant state at an energy of 42011.4 cm$^{-1}$ relative to zero energy of said ground state.

8. The method of claim 1 wherein the photons of said third frequency are produced by one or more pulsed lasers.

9. The method of claim 1 wherein the photons of the third frequency ionize atoms in the intermediate, resonant state at an energy of 42049.0 cm$^{-1}$ to the continuum states at an energy range of 49266.7 cm$^{-1}$~55000 cm$^{-1}$ relative to zero energy of said ground state.

10. The method of claim 1 wherein the photons of the third frequency ionize atoms in the intermediate, resonant state at an energy of 42011.4 cm$^{-1}$ to continuum states at an energy range of 49266.7 cm$^{-1}$~55000 cm$^{-1}$ relative to zero energy of said ground state.

11. The method of claim 1 wherein the step of collecting said isotope ions comprises applying an electric field to said vapor.

* * * * *

UNITED STATES PATENT AND TRADEMARK OFFICE
CERTIFICATE OF CORRECTION

| | | |
|---|---|---|
| PATENT NO. | : 7,323,651 B2 | Page 1 of 1 |
| APPLICATION NO. | : 10/522461 | |
| DATED | : January 29, 2008 | |
| INVENTOR(S) | : Jeong et al. | |

It is certified that error appears in the above-identified patent and that said Letters Patent is hereby corrected as shown below:

See the Drawings, FIG. 2, bottom left side, "6 $^2P_{3/2}$" should read -- 6 $^2P_{1/2}$ --

See the Drawings, FIG. 2, bottom right side, "6 $^2P_{1/2}$" should read -- 6 $^2P_{3/2}$ --

Face of the Patent, FIG. 2, bottom left side, "6 $^2P_{3/2}$" should read -- 6 $^2P_{1/2}$ -- and bottom right side, "6 $^2P_{1/2}$" should read -- 6 $^2P_{3/2}$ --

Column 3, Line 6, "is side" should read -- is a side --

Column 3, Line 16, "shows is the" should read -- shows the --

Column 4, Line 48, "temperative" should read -- a temperature --

Column 4, Line 49, "affect on the" should read -- affect the --

Signed and Sealed this

First Day of July, 2008

JON W. DUDAS
*Director of the United States Patent and Trademark Office*